Figure 7:
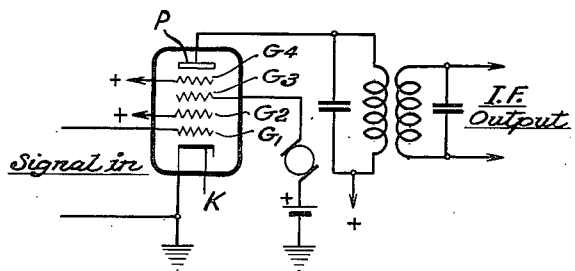

Sept. 1, 1942.  E. W. HEROLD  2,294,659
ELECTRON DISCHARGE DEVICE AND CIRCUIT
Filed May 17, 1941  5 Sheets-Sheet 1
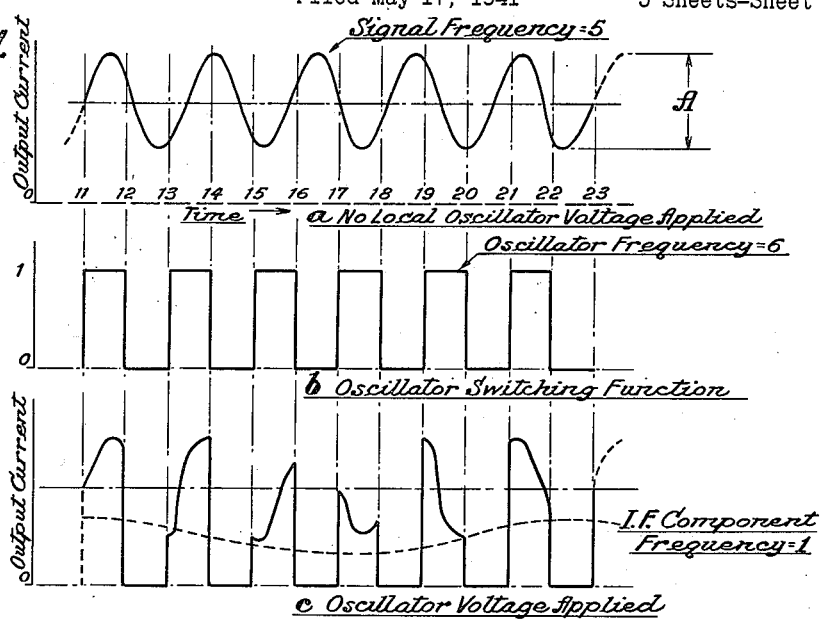
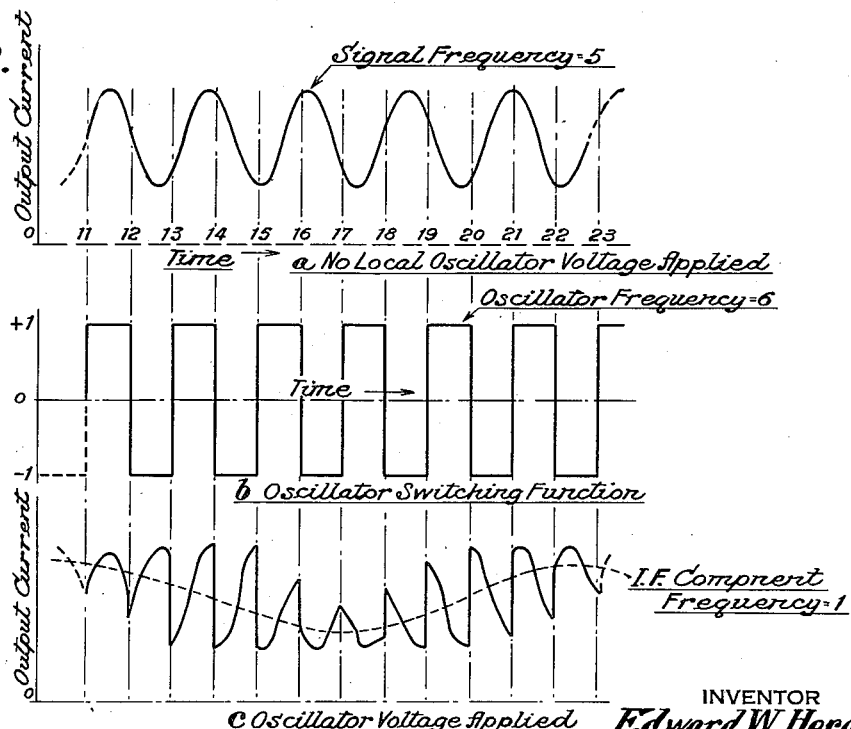
INVENTOR
Edward W. Herold
BY
Charles McClair
ATTORNEY Sept. 1, 1942.  E. W. HEROLD  2,294,659
ELECTRON DISCHARGE DEVICE AND CIRCUIT
Filed May 17, 1941  5 Sheets-Sheet 2
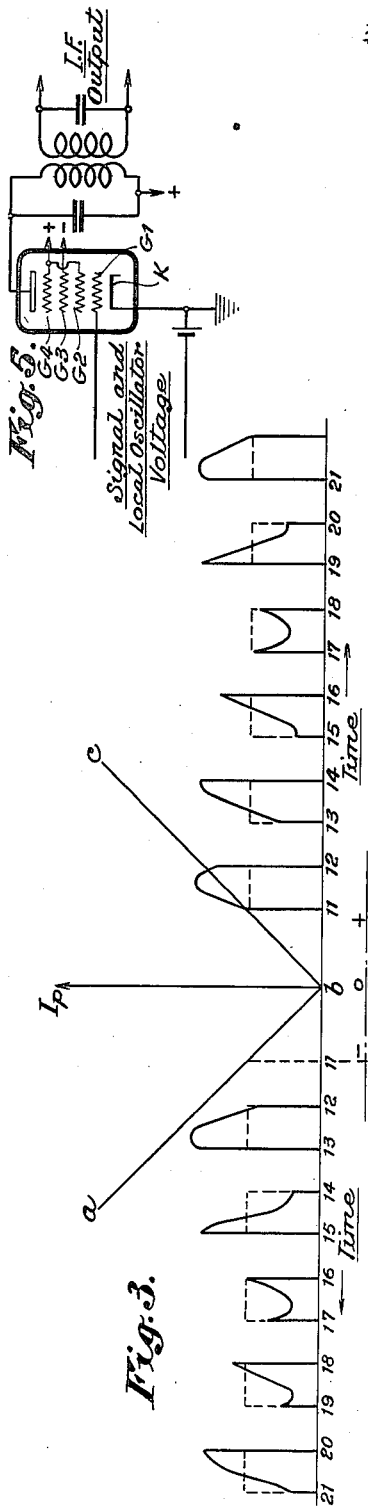
INVENTOR
Edward W. Herold
BY
Charles McClair
ATTORNEY Sept. 1, 1942.   E. W. HEROLD   2,294,659
ELECTRON DISCHARGE DEVICE AND CIRCUIT
Filed May 17, 1941   5 Sheets-Sheet 3

INVENTOR
*Edward W. Herold*
BY
*Charles McClair*
ATTORNEY

Sept. 1, 1942.   E. W. HEROLD   2,294,659
ELECTRON DISCHARGE DEVICE AND CIRCUIT
Filed May 17, 1941   5 Sheets-Sheet 4

Operation at 2nd Harmonic   Operation at 3rd Harmonic

INVENTOR
Edward W. Herold
BY
Charles McClair
ATTORNEY

Sept. 1, 1942.  E. W. HEROLD  2,294,659
ELECTRON DISCHARGE DEVICE AND CIRCUIT
Filed May 17, 1941   5 Sheets-Sheet 5
*Fig. 16.*
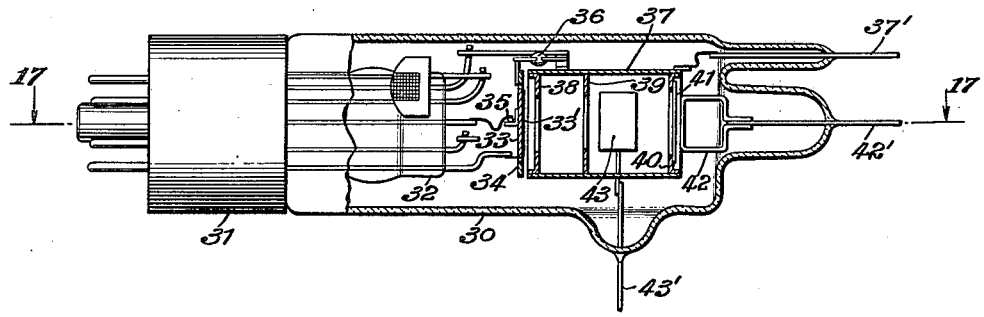
*Fig. 17.*
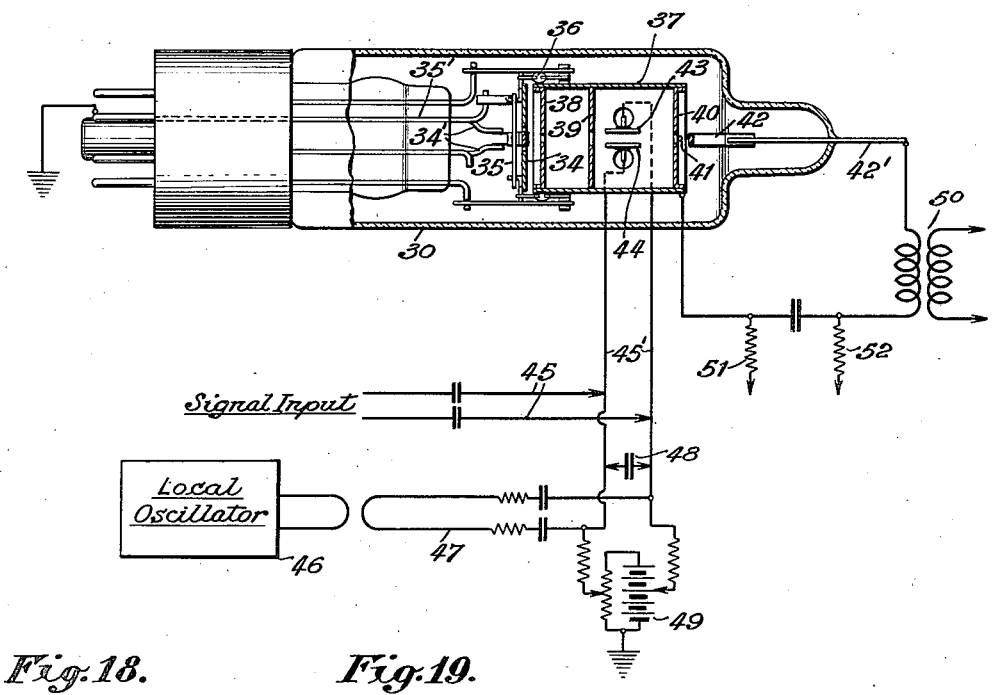
*Fig. 18.*   *Fig. 19.*
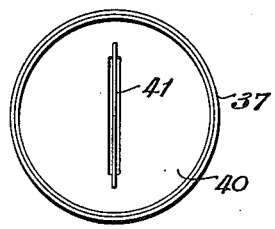 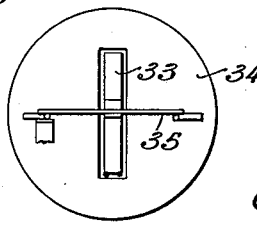
INVENTOR
Edward W. Herold
BY
Charles McClair
ATTORNEY Patented Sept. 1, 1942

2,294,659

UNITED STATES PATENT OFFICE 2,294,659

ELECTRON DISCHARGE DEVICE AND CIRCUIT

Edward W. Herold, Verona, N. J., assignor to Radio Corporation of America, a corporation of Delaware Application May 17, 1941, Serial No. 393,907

22 Claims. (Cl. 250—20)

My invention relates to electron discharge devices, more particularly to such devices useful for frequency conversion in superheterodyne reception, and associated circuits.

The superheterodyne method of reception has been almost universally adopted in modern communication because of ease of tuning, its excellent and constant selectivity and high sensitivity. In a superheterodyne receiver, as is well known, an incoming signal voltage of one frequency is combined with a local oscillator voltage of slightly different frequency to produce a voltage of a still different frequency, referred to as the intermediate frequency, which intermediate frequency voltage is subsequently amplified and utilized. The heart of the superheterodyne is the converter tube, that is the vacuum tube in which the signal voltage and local oscillator voltage are combined to produce the so-called intermediate frequency voltage. However, it has been found in the past that each new and improved converter tube developed during the progress of the tube art has a lower overall amplification and a poorer signal-to-noise ratio than amplifier tubes that include contemporary and parallel technological improvements. For this reason, it has been necessary in receivers designed for the best performance, to utilize a stage of amplification at the signal frequency between the antenna and the converter. Such amplification is frequently difficult to obtain and naturally increases the cost of the receiver because of the necessity of providing more elements in the way of coils, condensers and the like, as well as properly adjusting these elements for optimum operation.

An important factor in converter operation is the signal-to-noise ratio which can be obtained. Tube fluctuation noise is an important part of the total noise which limits the signal which can be received. It is desirable therefore to reduce such fluctuation noise.

The frequency-changing process which is undergone by the signal voltage in the converter tube may be considered either as modulation of a local oscillator voltage by the signal voltage or as a modulation of the signal voltage by the local oscillator voltage. The modulating process, in the well-known manner, generates at least two, new and additional frequencies equal to the sum and the difference of the signal and local oscillator frequencies. In the usual superheterodyne, one of the new frequencies is subsequently utilized as the intermediate frequency. With most devices used for frequency conversion sufficient non-linearity is present so that harmonics of the local oscillator frequency are also produced in the converting device itself. These harmonics may also be modulated by the signal voltage, to produce still other additional frequencies and it is possible to utilize one of the latter modulation products for the intermediate frequency voltage. Such conversion at harmonics of the local oscillator frequency is of particular value in the reception of ultra-high frequencies because at these high frequencies stability and ease of oscillation cannot be readily obtained at frequencies near that of the signal. In converters which have been used up to the present, the modulation products at harmonics of the local oscillator have been small and the performance of the converters rather poor.

As an example of conversion at various oscillator harmonics, consider a superheterodyne receiver tuned to receive a signal of 500 Mc./s. If an intermediate frequency of 20 Mc./s. is utilized, the converter stage of the receiver will normally have a local oscillator at a frequency of 480 Mc./s. Such operation is at oscillator fundamental. If, however, a local oscillator of 240 Mc./s. is used, and a pure sine wave of this lower frequency is applied to the converter tube, it will be found that an intermediate frequency of 20 Mc./s. is again generated, even though none of the voltages applied to the tube have a frequency of 480 Mc./s. Such conversion would be at the second harmonic of the applied local oscillator frequency, but it does not require that the local oscillator voltage itself have any harmonic content whatever. The harmonic frequency necessary for conversion may be considered as self-generated in the converter device itself. In the same way it will be found that a 20 Mc./s. intermediate-frequency is produced when the local oscillator has frequencies of 180 Mc./s. (operation at third harmonic), 120 Mc./s. (operation at fourth harmonic), etc.

It is therefore an object of my invention to provide an improved form of electron discharge device, particularly useful for frequency conversion in superheterodyne reception and in which the overall amplification more clearly matches amplifier tubes of contemporary design.

A further object of my invention is to provide an improved electron discharge device suitable as a converter and having very small fluctuation noises and having high conversion efficiency so as to give improved signal-to-noise ratios.

Another object of my invention is to provide an improved electron discharge device useful for conversion at ultra-high frequencies and in particular to provide such a device having a high degree of efficiency when utilizing local oscillator voltages at one-half, one-third or still smaller fractions of the frequency of the local oscillator voltage normally required.

Figure 8:
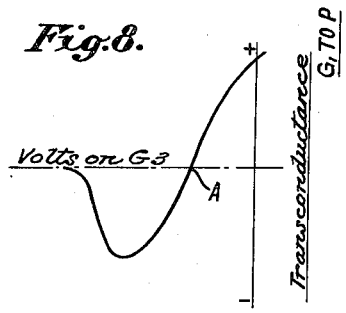
Figure 9:
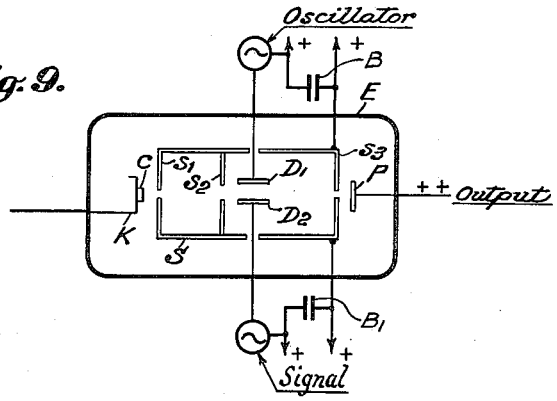
Figure 11:
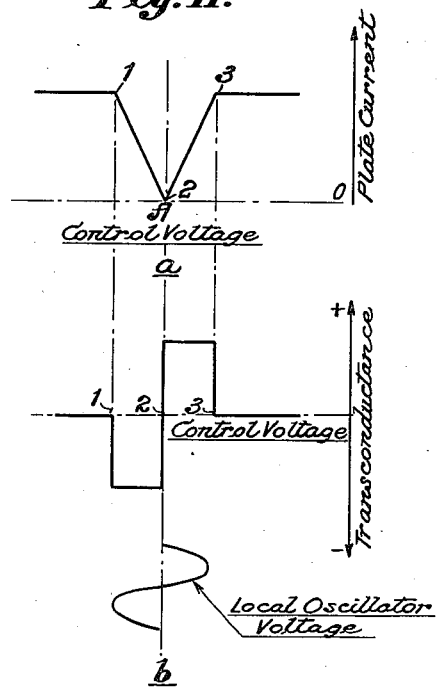
Figure 10:
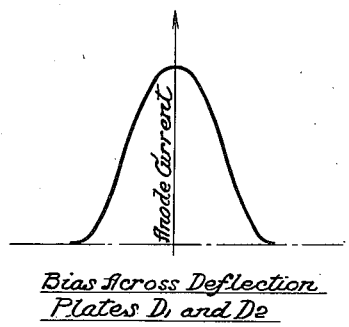
Figure 12:
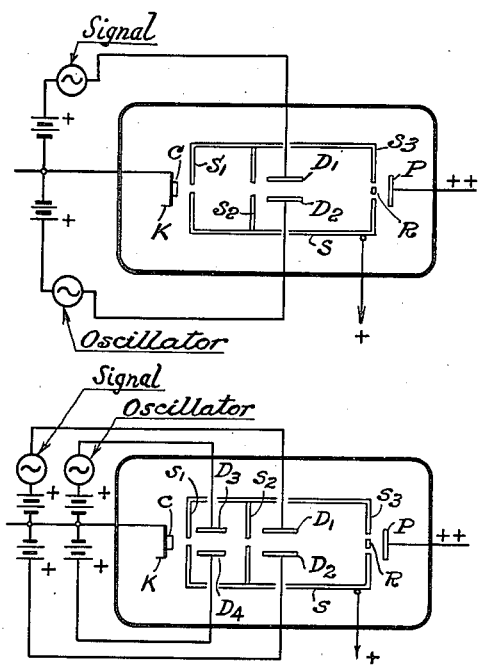
Figure 12A:
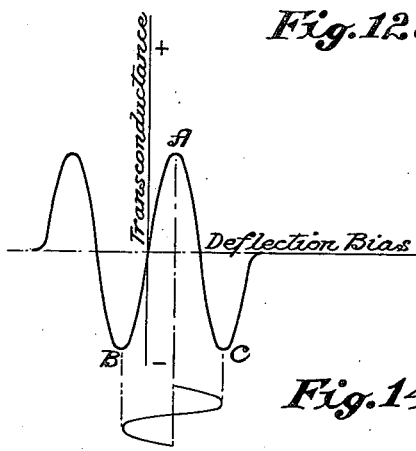
Figure 13:
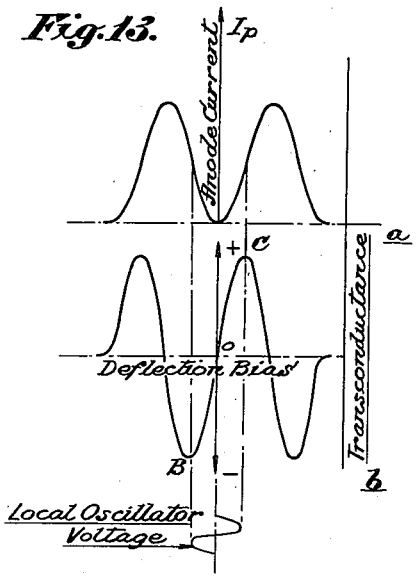
Figures 14, 15:
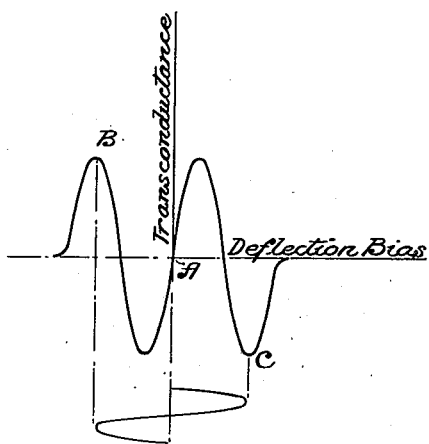

The novel features which I believe to be characteristic of my invention are set forth with particularity in the appended claims, but the invention itself will best be understood by reference to the following description taken in connection with the accompanying drawings in which Figures 1a, b and c are graphic representations of the operation of an electron discharge device used as a conventional converter tube, Figures 2a, b and c are graphic representations of the operation of an electron discharge device made and operated according to my invention, Figure 3 is a detailed graph explaining the formation of the curve shown in Figure 2c, Figure 4 is a graph showing certain characteristics of an ideal tube made according to my invention, Figure 5 is a diagrammatic representation of one form of electron discharge device and associated circuit made according to my invention, Figures 6a and b are graphic representations of the operating characteristics of the electron discharge device disclosed in Figure 5, Figure 7 shows a further modification of an electron discharge device and circuit made according to my invention, Figure 8 is a curve of the transconductance of the tube shown in Figure 7, Figure 9 is a still further modification of an electron discharge device made according to my invention, Figure 10 is a graph showing certain characteristics of the tube shown in Figure 9, Figures 11a and b show other operating characteristics of a further form of tube made according to my invention, Figure 12 is a diagrammatic cross-sectional view of a tube made according to my invention and its associated circuit, and Figure 12a a modification of Figure 12 shown as a diagrammatic cross sectional view of a tube made according to my invention and its associated circuit, Figure 13 is a graphic representation of the operating characteristics of the electron discharge device shown in Figure 12, Figures 14 and 15 are graphic illustrations of certain operating characteristics of an electron discharge device made according to my invention, Figure 16 is a longitudinal section of an electron discharge device made according to my invention, Figure 17 is a longitudinal section taken at 90° to the section shown in Figure 16 and a diagrammatic representation of the associated circuit utilized with the tube shown in Figure 16, and Figures 18 and 19 are enlarged end views of the electrode system showing details of construction.

In the conversion process as it has heretofore been understood and used, the local oscillator voltage, which has been applied to the converter, periodically varies the intensity of the signal frequency current in the tube so as to amplitude modulate it. Optimum results are obtained in the tube when this modulation is complete; that is, when the local oscillator voltage periodically changes the signal frequency current from its maximum possible value to zero. Such an action by the local oscillator is similar to an open-circuiting switch which periodically turns the signal frequency current on and off. A physical picture of such a conversion process in an ideal converter tube, utilizing an oscillator which performs a switching function, is shown in Figures 1a, b and c.

The curve shown in Figure 1a represents the output current with respect to time which would result in a tube if only the signal voltage were applied to the control grid.

Figure 1b represents the switching function, with respect to time, which is a result of the applied oscillator voltage. The frequency ratio of the signal voltage frequency to the oscillator voltage frequency may be taken as 5 to 6. Figure 1c shows the result of applying both voltages to the converter tube.

In Figure 1a the signal voltage show sine waves of arbitrary frequency which may be considered the output current at signal frequency of a converter tube with small applied signal voltage when the oscillator voltage is not present. The tube is assumed to be adjusted to the point of maximum signal electrode transconductance so that the curve represents the maximum alternating current of which the tube is capable for the given small signal voltage. It represents also, therefore, the maximum amplification point of the tube considered as an amplifier. The effect of an applied oscillator voltage at a frequency 20% higher than that of the signal may be considered in this ideal case as switching the signal on and off in the manner represented in Figure 1b. When the function 1b is zero it represents the oscillator as cutting off the signal frequency current completely; when it reaches unity, the signal frequency current is permitted to have its maximum value. The result of applying the switching function is shown in Figure 1c, which represents output current with oscillator voltage applied. Since the output of current shown in 1c is not a sine wave it contains components at several frequencies. These can be shown to be chiefly the signal frequency, the fundamental and harmonics of the oscillator frequency and sum and difference frequencies of these. The normal intermediate frequency current is the difference between oscillator and signal frequencies and is shown by the dotted line. It can be shown by the Fourier analysis that the magnitude of this component is only 32% of the signal frequency current represented in Figure 1a. It is this fact which has been the primary cause of the inferiority of converters to amplifiers, so that the conversion transconductance is only 32%, or even less in practical tubes, of the amplifier transconductance.

It is observed that, during half the time in Figure 1c, the converter tube is virtually inoperative. In accordance with my invention I double the conversion transconductance by utilizing the local oscillator in a different manner so that the tube remains operative during the entire oscillator cycle. In accordance with my new method I utilize the local oscillator to periodically reverse the phase of the signal frequency current. Such an action by the local oscillator is similar to a reversing switch which periodically alters the phase of the signal-frequency current. This new approach can be considered in an idealized form as phase-reversal modulation as distinguished from the amplitude modulation used in conventional converters. The improved conversion may better be understood by reference to Figures 2 and 3.

In Figure 2a the signal frequency is again shown with no oscillator voltage applied. Figure 2b represents the switching function, with respect to time, which is a result of the applied oscillator voltage. It varies from +1 to −1 and indicates thereby a variation of the signal current, not in amplitude, but in phase. In other words, the ideal tube will have such characteristics that between the points 11 and 12 the signal-frequency component of current will be substantially in phase with the oscillator voltage but between the points 12 and 13 the oscillator will reverse the phase of this signal-frequency current component, this reversal takes place in the time intervals 12—13, 14—15, 16—17, 18—19, 20—21, 22—23 and so forth. As a result of this action the output current and its intermediate frequency component will have the forms shown in Figure 2c. A comparison with Figure 1c shows that the intermediate-frequency component is greater in magnitude than Figure 1c and, as may be verified by Fourier analysis, the intermediate frequency component of 2c is 64% of the original signal frequency current. The converter, therefore, has been doubled in efficiency and has been brought closer to the amplifier tubes of contemporary design.

In order to better understand what actually takes place when the signal voltage and oscillator voltage are combined in the manner described in Figure 2, reference may be had to Figure 3.

Let it be assumed that the tube being utilized has a characteristic represented by the lines $ab$, $bc$. The vertical axis represents the anode or output current $I_p$ and the horizontal axis on either side of the line represents the voltage of the signal and the oscillator applied to the control grid, these voltages swinging about the point $b$. It will thus be apparent that if the voltage on the grid is swung from point $b$ to the right or left, that the current in the output will increase and as it is swung back to point $b$ the current in the output will decrease. It will also be apparent that in point of time as shown the current flow resulting from a swing to the right of the point $b$ will be 180° in advance of the current resulting from a swing of the voltage to the left of the point $b$. Thus, if the square topped oscillator voltage alone is applied to the control grid the wave form of the current in the output of the tube will be that represented by the solid and dotted lines forming elongated rectangles which are a reproduction of the portions of the oscillator voltage to the right and left of the point $b$. If now the signal voltage is superimposed on the oscillator voltage, when the oscillator voltage and signal voltage are in phase, there is an additive action so that the current curve will have somewhat the form represented, for example, by the curves between points 11 and 12 to the right of $b$ and 12 and 13 to the left of $b$. Likewise when the signal and oscillator voltages are out of phase there is a subtractive action so that the current wave form in the output circuit will have the form represented in the time intervals between 17 and 18 and 16 and 17 to the right and left respectively of point $b$. Inasmuch as all current flowing during different time intervals as represented to the right and left of the point $b$, are actually combined in a single output, a true picture of the output wave may be formed by rotating the left hand portion of the graph through 180° about the axis $bI_p$ so as to superimpose the parts to the left of the vertical line through $b$ on the parts to the right of the line. It will be observed then that in addition to filling the time intervals in gaps to the right of line through $b$ that the portions to the left of the line are also reversed to obtain the proper time lapse relationship. The result of this procedure will be to produce the curve shown in Figure 2c.

In practice, the local oscillator voltage may be a sine wave without substantially altering the intermediate-frequency output current although, in this case, the plate current is not so simply represented as in Figure 3.

It is not feasible to accomplish such a periodic change in phase of the signal frequency current in tubes designed for the conventional mode of operation. In the converter tubes devised to make use of the new principle, the local oscillator periodically varies the sign of the signal electrode to the output electrode transconductance. This is equivalent to a periodic reversal of phase of the output current. This characteristic of transconductance can be relied upon for obtaining the phase reversal effect since mathematically the tube transconductance is represented by the slope of the output-electrode current signal-electrode voltage characteristic; that is, if for an increase in signal-electrode voltage there is an increase in output-electrode current, the transconductance is positive. If the output-electrode current decreases with an increase in control-electrode voltage, the transconductance is negative. The ratio of change of output-electrode current to change in control-electrode voltage is a measure of the magnitude of the transconductance and this ratio may vary or may remain constant as the control-electrode voltage increases or decreases. The transconductance passes through a zero value when the curve of output-electrode current vs. signal-electrode voltage reaches a maximum or minimum point and starts to reverse, or when the current falls to zero. This can best be understood by reference to Figure 4.

I practice my invention by utilizing the negative transconductance and positive transconductance characteristics of tubes. For a simple and idealized illustration, reference may be had to the plate-current vs. control-electrode voltage curve shown in Figure 4a. As the control-electrode voltage is increased, represented by movement to the right, the output current increases as indicated by the curve. It will be observed that from the point at which the current starts to increase from zero at point 1 to point 2, that the rate of change of plate current to the change in control-voltage is constant and positive in sine. This is represented by the flat positive portion of the transconductance curve $4b$ from point 1 to point 2. At the point 2, however, the plate current has reached its maximum and starts to return to a zero value. At this point the transconductance instantly goes through zero and assumes a negative value and, since the rate of change of plate current to control voltage remains constant from point 2 to point 3, the transconductance remains constant and negative until the current reaches zero at point 3 at which instant the transconductance also goes to zero. If a sine-wave local oscillator voltage of not too great amplitude is applied to the control-electrode and this electrode is biased so that the voltage swings about the point A, it is seen that the transconductance is periodically altered from the positive to the negative. Hence, if a small signal is also applied, the operation is equivalent to periodic changes in phase of the signal frequency output current. This characteristic can be made use of in a tube of the type described below.

In Figure 5 is shown one form of tube which may be designed for high conversion transconductance at the oscillator voltage fundamental frequency. In this figure the cathode K is followed by control grid $G_1$, a positively biased grid $G_2$, negatively biased grid $G_3$, a positive grid $G_4$ and an output anode connected to intermediate frequency output circuit. Such a tube displays a negative transconductance characteristic over portions of its plate current-grid voltage curve. In operation a virtual cathode is formed between the electrodes $G_2$ and $G_3$ when sufficient current is permitted to enter this region, and a plate current-control electrode voltage curve will result similar to the curve shown in Figure 6a. The curve will be seen to approximate the idealized characteristic of Figure 4a. A transconductance characteristic of such a tube is shown in Figure 6b. When the local oscillator voltage is applied together with a fixed bias so that the grid $G_1$ voltage is swung about the point A between the limits B and C, it will be seen that the signal frequency output current is periodically varied from a maximum value to a minimum value at one phase and from a maximum value to a minimum value of reversed phase. Such a practical case differs from the ideal one pictured in Figure 4 in that the periodic change in phase is accompanied by intermediate changes in signal current amplitude; that is, a switch from one phase to the opposite phase is not instantaneous as is represented by Figure 4. The combination of amplitude and phase change is slightly less effective for conversion than the ideal case illustrated in Figure 4.

Now the effectiveness of a converter is measured in terms of a quantity called the conversion transconductance which is the ratio of the intermediate-frequency output current to the signal input voltage. It can be shown that the conversion transconductance with respect to oscillator fundamental is given by one-half of the fundamental component of the periodic curve of transconductance against time which is given from Figure 6b when the local oscillator voltage is applied. For a curve resembling the shape of the one shown, the conversion transconductance is about 50% of the peak transconductance. This is in marked contrast to conventional converters as, for example, a tube similar to that shown in Figure 5 but without the virtual cathode phenomenon and the resulting peaked plate current characteristic and in which the conversion transconductance is in the neighborhood of 25% of the maximum transconductance.

A modification of an electron discharge device and circuit employing my invention and applied to conversion at an oscillator voltage of fundamental frequency is shown in Figure 7. A mixer tube is here shown which again receives the signal voltage on the control grid $G_1$ but in which the local oscillator voltage is applied to the second control electrode $G_3$ positioned between the grid $G_1$ and the output anode. An accelerating electrode $G_2$ and a screen electrode $G_4$ are operated at positive potentials. The circuit and general tube configuration are similar to the well-known arrangement for frequency mixing using the tube type designated as the 6L7. In accordance with my invention, however, the tube is designed so that the variation of potential of $G_3$ will vary the nature and extent of a virtual cathode formed between the electrodes $G_2$ and $G_3$ in a particular way. When the potential of the grid $G_3$ is very negative and a large electron current flows through $G_1$ and $G_2$, a strong virtual cathode will be set up between the grids $G_2$ and $G_3$. An increase in this current (as caused, for example, by an increase in potential of $G_1$) will result in a change in position of the virtual cathode away from $G_3$ closer to $G_2$ and a consequent decrease in plate current. That is, an increase in potential of $G_1$ will decrease the plate current so that the tube will display a negative transconductance. This is shown in Figure 8 at the more negative values of the voltage on grid 3. The curve shows the transconductance of the control electrode $G_1$ to the plate as a function of potential on $G_3$. At potentials on $G_3$ greater than that corresponding to the point A on the curve, the virtual cathode is sufficiently thinned out so that an increase in potential on $G_1$ will cause an increased plate current. Application of a local oscillator voltage to $G_3$ with a fixed bias near the point A will cause the signal electrode transconductance to swing periodically from the positive to the negative and will give a rise therefore to a signal frequency current in the output anode which varies periodically in phase. The tube will have a much higher conversion transconductance than would a conventional tube operating on the same principle as Figure 7 but which did not make use of the negative transconductance which may be attained by proper design and operation.

The preferred form of tube with which my invention can be practiced is of the beam type employing electrostatic deflection so that an on-and-off characteristic in the output system can be had. The schematic longitudinal section and circuit arrangement shown in Figure 9 incorporates my invention. Here a cathode K provided with emitting surface C provides an electron beam directed to the collector or plate P through the shielding cylinder S provided with a plurality of successive electrode elements $S_1$, $S_2$ and $S_3$, the apertures being aligned. Positioned adjacent $S_2$ is a pair of deflecting electrodes $D_1$ and $D_2$ for deflecting the beam across the aperture in the element $S_3$. The electrons are accelerated by the electrode arrangement S and are formed into a sharply defined electron beam by the apertures in $S_1$ and $S_2$ after which the beam passes between deflecting plates $D_1$ and $D_2$ to the final aperture in the element $S_3$. As the potential difference between deflecting plates is varied, the beam is deflected past the aperture in $S_3$ and a plate current characteristic similar to that shown in Figure 10 is obtained. This is a close approach to the ideal characteristic of Figure 4a and the tube will make a good converter. The signal voltage and local oscillator voltage are both applied across the deflecting plates or it may be desirable as shown to connect the local oscillator voltage between the electrode arrangement S and plate $D_1$ and the signal voltage between plate $D_2$ and the electrode arrangement S. As shown in the figure, blocking condensers B and $B_1$ are provided to permit different fixed potentials to be applied to the deflecting electrodes $D_1$ and $D_2$.

An important aspect of converter operation is the signal-to-noise ratio which can be obtained. Tube fluctuation noise is an important part of the total noise which limits the signal which can be received. A large part of the tube noise in many tubes is proportional to the current reaching the output electrode. It is possible to obtain a considerable improvement in signal-to-noise ratio by so designing the tube characteristic that, without any sacrifice in conversion transconductance, the operating plate current is held to a small value.

Referring to Figure 4a, it is apparent that the operating plate current in such a tube is normally quite high since it is operated at peak current. An idealized tube characteristic of a tube which may also be utilized for conversion according to my idea but which is free of the high operating current is shown in Figures 11a and 11b. In this arrangement the oscillator voltage is applied at the point A and the same high transconductance may be obtained as with a tube having characteristics shown in Figure 4a. However, the operating plate current may be held at very small value by using a small local oscillator voltage. As a result the tube noise is reduced to a very small value and high signal-to-noise ratio can be obtained.

To better understand the significance of noise fluctuation, the following explanation is referred to. Fluctuation noise can be represented in terms of an energy content which is the result of random statistical variations in the electron current, as caused by the cathode temperature, for example. Thus, if a tube has a fluctuation-noise energy W and a plate current $I_b$, if we parallel two such tubes we get Plate current $= 2I_b$
Noise energy $= 2W$ and both plate current and noise energy are doubled. Thus it is clear that the noise energy and the plate current can be expected to be proportional, other tube conditions remaining the same. The noise current or voltage from a tube varies as the square root of the energy and, therefore, may be expected to vary as the square root of the plate current. Now the signal output current or voltage varies as $g_m$ or $g_c$ so that $$\frac{\text{Signal output}}{\text{Noise output}} = k \frac{g_m (\text{or } g_c)}{\sqrt{I_b}}$$

where $g_m$ = transconductance
$g_c$ = conversion transconductance
$k$ = proportionality constant The relative conversion transconductance $g_c$ of a tube having the characteristic of Figure 11 is the same as that of a tube having the characteristic of Figure 4 but its plate current is much lower. In this way the tube made according to Figure 11 will have a better signal to noise ratio.

A tube having the characteristics shown in Figures 11a and b is shown in a longitudinal sectional schematic view in Figure 12. In this arrangement the last apertured element $S_3$ is provided with a rod R so that a pair of apertures is provided instead of a single aperture. As a result the output current characteristic is double humped as shown in Figure 13a which in its center portion is an approach to the ideal shown in Figure 11a. It is apparent that by swinging the oscillating voltage about the point A the operating anode current is held very small. As pointed out above this permits high signal-to-noise ratio to be obtained. The transconductance, or slope, characteristic is shown in Figure 13b. When the conversion is at the oscillator fundamental, the local oscillator is adjusted to swing about point A between the limits B and C. In this way each period of the local oscillator voltage leads to a reversal in phase in the signal frequency output current.

In Figure 12a is shown a modification of the tube shown in Figure 12. However, instead of applying both the signal and oscillator voltages to the deflecting plates $D_1$ and $D_2$, a second pair of deflecting plates $D_3$ and $D_4$ are provided between apertured elements $S_1$ and $S_2$, the oscillator voltage being applied between the electrode $D_3$ and the cathode, the deflecting electrode $D_4$ being maintained at a fixed potential. The result will be a double deflection of the electron beam originating at the cathode. The effect of the first deflecting electrodes $D_3$ $D_4$ is the same as that of shifting the deflection bias along the axis of the deflection bias curve, in the same manner as is done when the local oscillator voltage and signal voltage are both applied to the deflecting electrodes $D_1$ $D_2$. As a result, therefore, each period of local oscillator voltage leads to a reversal in phase in the signal frequency component of the output current.

A tube having the characteristics of Figures 13a and b is also suitable for operation at an oscillator harmonic. As pointed out above, at frequencies of one thousand megacycles and higher, it is advantageous to operate the local oscillator at a frequency of 1/2, 1/3, or in general 1/$n$th of that normally required where $n$ is any integer. Conversion is then accomplished at a harmonic of the local oscillator. With conventional tubes heretofore used for conversion at such a harmonic, conversion efficiency is poor and has decreased progressively as the order of the harmonic increased. This is basically due to the fact that the harmonics of the applied local oscillator are generated in the converter as a by-product and are not strong. According to my invention the tube is so designed that the local oscillator harmonic, at which conversion is desired, is the major portion of the converter tube current. Stated in another way, the tube is so designed that, for each single reversal of the alternating voltage supplied by the local oscillator, the phase of the signal frequency current is reversed $n$ times, where $n$ is the order of the harmonic at which operation is desired. In practice, it is possible to obtain a single tube characteristic which gives very high and nearly equal conversion at either fundamental, second harmonic or third harmonic of the local oscillator by a change in operating conditions only, and the conversion transconductance for each of the three modes of operation approaches values of from 40 to 60% of the transconductance of the same tube used as an amplifier.

Referring again to the tube of Figure 12 and the characteristics of Figures 13a and b, when conversion is desired on oscillator harmonics, the tube shown may be so operated by controlling the beam swing that, for each reversal of local oscillator voltage, the signal frequency current is reversed in phase two, or even three, times. This may be brought out by reference to Figures 14 and 15 where the operating conditions for conversion at second harmonic and at third harmonic of the local oscillator are shown in reference to transconductance characteristic (Figure 13b) of the tube. The number of reversals in phase can be quickly found by counting the number of times the transconductance crosses the zero axis between the two limits of the oscillator swing B and C. It can be easily shown by analysis that a conversion transconductance of 50% or so of the amplifier transconductance at the second harmonic and 40% or so at the third harmonic operation can be obtained in practical tubes having characteristics similar to Figures 13a and b.

It is clear that operation at harmonics higher than the third can be accomplished more efficiently by using larger numbers of apertures in the third apertured element of electrode system S of Figure 12. The tube plate current characteristic will then have more humps than the one shown in Figure 13b and, as a result, more than three complete phase reversals will be made possible for each single periodicity of the local oscillator. The conversion at the lower oscillator fundamental frequencies, i. e. at the higher harmonics, is substantially as effective as at the fundamental. The highest possible conversion transconductance for a given amplifier transconductance would be obtained from a tube whose curve of transconductance versus bias consisted of rectangular pulses shaped similar to the Lissajous figure resulting from a sine wave combined with a square wave of $n$ times the frequency of the sine wave, where $n$ is the order of harmonic at which operation is desired. Inasmuch as the operation at $n$ greater than 3 does not seem necessary in most practical cases, a tube substantially like that shown in Figure 12 is probably sufficiently close to the ideal to be satisfactory in most applications.

In Figures 16 and 17 are shown longitudinal sections, at right angles to each other, with an associated circuit shown in Figure 17 of converter tubes which have been made and operated at 500 and 1000 megacycles in accordance with the principles I have outlined. These tubes have shown themselves to be advantageous in both gain and signal-to-noise ratio compared with conventional converter arrangements.

Referring to Figure 16, the electron discharge device comprises an evacuated envelope 30 having the usual base 31 and press 32, which may be of the annular type to permit arrangement of the electrode leads and supports in a circle.

The cathode assembly for supplying the electrons in the form of a beam comprises an indirectly heated cathode 33, as best shown in Figures 16, 17 and 19, coated on one side with emitting material 33'. The cathode is supported within an aperture in a beam focussing and forming plate 34 to which the cathode is electrically connected and supported by a connecting bar 35 connected to one of the leads 35' in the press. The heating leads 34' can be seen in Figure 17. This cathode assembly is supported by means of insulating bead supports 36 from the outer cylinder 37 of the apertured electrode system through which the beam is directed. Within the cylinder 37 are supported three apertured disc-like members 38, 39 and 40 having aligned elongated rectangular shaped apertures.

In Figure 17 it will be observed that the widths of the apertures in the elements 38, 39 and 40 are different. Due to the small dimensions involved it is difficult to show accurately the relative sizes of these apertures. However, in one example of a tube actually made to operate between 400 and 600 megacycles per second, the first aperture has a width of .003 inch, the second .004 inch and the third .023 inch. The apertures are .25 inch long. The diameter of the cylindrical member is ¾ inch and the distance between the cathode and the first insert or apertured element 34 is ⅛ inch. The distance between the second apertured element 39 and deflecting plate 43 is .04 inch and the spacing between deflecting electrodes .04 inch, the length of the plates being ¼ of an inch. However, the plates are normally given an electrical length not greater than the distance covered by electrons during one-half the period of the highest frequency at which it is intended to operate the tube. The length of the cylinder is 1 inch, the insert 39 being spaced ⅜ of an inch from the cathode end of the cylinder, and the inserts 38 and 40 being spaced .04 inch inside the ends of the cylinder 37. Rod 41 is .008 inch.

The beam of electrons after passing through the deflecting electrode system is collected by means of the anode 42 formed in the shape of a loop. The anode loop 42 is coated with secondary electron emitting material, the secondary electrons being collected by the cylinder 37 during operation of the device. The purpose of providing a loop form is to provide easy coupling to high frequency heating apparatus. This is necessary for the formation of a proper secondary electron emitting surface during manufacture of the tube. It is obvious, however, that it is not necessary that the anode be coated with secondary emitting material for increasing the amplification and that the tube could operate to produce the results desired without utilizing a secondary emitting surface. The cylinder 37 is provided with a lead 37' and the anode is supported by means of lead 42' sealed in an envelope 30. As best shown in Figure 17, the beam of electrons is directed through the apertured electrode system and between the deflecting electrodes 43 and 44 to the last apertured electrode 40 having, as best shown in Figure 18, a rod or wire 41 centrally disposed longitudinally of the aperture to provide a pair of apertures for the purpose described above to obtain the control voltage-anode current characteristic shown in Figure 13a.

As shown, the transmission line 45' terminated by the tuning condenser 48 has electrically connected to it the signal input transmission line system 45 and is coupled to the local oscillator 46 through coupling loop 47. The necessary bias voltages are supplied by the voltage supply source 49, the voltage to the deflecting electrode assembly 37 and output electrode 42 being supplied by means of the leads 51 and 52 provided with isolating resistors, the output circuit 50 being connected to the output electrode 42 through lead 42'.

The deflecting electrode and lens system may be made in accordance with the principles set forth in the copending application of George Ross Kilgore, Serial No. 342,625 filed June 27, 1940.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A frequency changing system for superheterodyne operation and including an electron discharge device provided with a source of electrons, a control electrode means and an output electrode toward which said electrons are directed to produce an output current, said electron discharge device having a transconductance characteristic passing through negative and positive values, means for applying operating voltages to said electron discharge device for adjusting said device to a point of transconductance such that with varying control voltages applied to said control electrode means, the transconductance will vary between negative and positive values, an output circuit connected to said electron discharge device, means for applying to said control electrode means a varying voltage at one frequency and other means for applying to said control electrode means a varying voltage at another frequency, the application of said voltages at different frequencies producing in effect a periodic phase reversal of the component of output current at said one frequency in the output electrode, and producing a component of output current at a third frequency in the output circuit.

2. A frequency changing system for superheterodyne operation and including an electron discharge device having a source of electrons, a control electrode means, and an output electrode toward which said electrons are directed to produce an output current, said electron discharge device having a transconductance characteristic passing successively through negative and positive values, and having maximum limits at said negative and positive values, means for applying operating voltages to said electron discharge device for adjusting said device to a point of zero transconductance such that with varying control voltages applied to said control electrode means, the transconductance will vary between negative and positive values, an output circuit connected to said electron discharge device, means for applying to said control electrode means a varying voltage of one frequency and other means for applying to said control electrode means a varying voltage of another frequency, the application of said voltages at different frequencies producing in effect a periodic phase reversal of the component of output current at said one frequency in the output circuit and a component of output current at the third frequency in the output circuit.

3. A frequency changing system for superheterodyne operation and including an electron discharge device having a source of electrons, a control electrode means, and an output electrode toward which said electrons are directed to produce an output current, said electron discharge device having a transconductance characteristic passing successively through negative and positive values, and having maximum negative and positive values, means for applying operating voltages to said electron discharge device for adjusting said device to a point of maximum transconductance such that with varying control voltages applied to said control electrode means the transconductance will vary between negative and positive values, an output circuit connected to said electron discharge device, means for applying to said control electrode means a varying voltage at one frequency and other means for applying to said control electrode means a varying voltage of another frequency, the application of said voltages at different frequencies producing in effect a periodic phase reversal of the component of output current at said one frequency in the output circuit and a component of output current at the third frequency in the output circuit.

4. A frequency changing system for superheterodyne operation and including an electron discharge device having a source of electrons, a control electrode means and an output electrode toward which said electrons are directed to produce an output current and having a control voltage-output current characteristic in which the output current curve experiences a reversal of slope, means for applying operating voltages to said electron discharge device for adjusting said device to a point on the control voltage-output current characteristic between portions where the output current curve experiences a reversal of slope, means for applying to said control electrode means a varying voltage at one frequency and means for applying to said control electrode means a voltage at another frequency for producing a periodic reversal of the slope of the current characteristic and for producing a component of output current at a third frequency.

5. A frequency changing system for superheterodyne operation and including an electron discharge device provided with a source of electrons, a control electrode means and an output electrode toward which said electrons are directed to produce an output current, said electron discharge device having a control voltage-output current characteristic in which the output current curve experiences a reversal of slope and passes through a point of minimum current, means for applying operating voltages to said electron discharge device for adjusting said device to a point of minimum current between portions of the current curve of opposite slope, means for applying to said control electrode means a varying voltage at one frequency and means for applying to said control electrode means a varying voltage at another frequency for periodically changing the slope of the current characteristic and to produce an output current component at a third frequency.

6. A frequency changing system for superheterodyne operation and including an electron discharge device provided with a source of electrons, a control electrode means and an output electrode toward which said electrons are directed to produce an output current, said electron discharge device having a control voltage-output current characteristic in which the output current curve experiences a reversal of slope and passes through a point of maximum current, means for applying operating voltages to said electron discharge device for adjusting said device to a point of maximum current between portions of the current curve of opposite slope, means for applying to said control electrode means a varying voltage at one frequency and means for applying to said control electrode means a varying voltage at another frequency for periodically changing the slope of the current characteristic and to produce an output current component at a third frequency.

7. A frequency changing system for superheterodyne operation and including an electron discharge device provided with a source of electrons, a control electrode means and an output electrode toward which said electrons are directed to produce an output current, said electron discharge device having a control voltage output current characteristic in which the output current curve experiences a reversal of slope and passes through a minimum and maximum value of current, means for applying operating voltages to said electron discharge device for adjusting said device to a point on the current curve between the maximum and minimum values, means for applying to said control electrode means a varying voltage at one frequency and means for applying to said control electrode means a varying voltage at another frequency for periodically changing the slope of the current characteristic and to produce an output current component at a third frequency.

8. A frequency changing system for superheterodyne operation and including an electron discharge device having a source of electrons, a control electrode means, and an output electrode toward which said electrons are directed to produce an output current and having a control voltage-output current characteristic such that the current alternately increases and decreases as the control voltage is continuously varied in the same direction whereby the output current curve experiences a reversal of slope, means for applying operating voltages to said electron discharge device for adjusting said device to a point on the control voltage-output current characteristic curve such that with varying control voltages applied to said control electrode means, the output current alternately increases and decreases with change in control voltage continuously in the same direction, means for applying to said control electrode means a varying voltage at one frequency and other means for applying to said control electrode means a voltage of another frequency, said varying voltages of different frequencies producing a periodic reversal of slope of the output current at said one frequency, and an output current component at a third different frequency.

9. A frequency changing system for superheterodyne operation and including an electron discharge device provided with a source of electrons, a control electrode means and an output electrode toward which said electrons are directed to produce an output current, said electron discharge device having a transconductance characteristic passing a plurality of times in succession through negative and positive values whereby the output current experiences a reversal of slope, means for applying operating voltages to said electron discharge device for adjusting said device to a predetermined point of transconductance whereby varying voltages applied to said control electrode means will cause said transconductance characteristic to pass a plurality of times successively through negative and positive values, means for applying to said control electrode means a varying voltage at one frequency and other means for applying to said control electrode means a varying voltage at another frequency for producing a component of output current at a third frequency.

10. A frequency changing system for superheterodyne operation and including an electron discharge device having a cathode for supplying a stream of electrons and an anode for collecting said electrons, an apertured electrode positioned in front of said anode and a pair of deflecting electrodes between the cathode and the apertured electrode, said electron discharge device having a transconductance characteristic passing through positive and negative values when the stream of electrons is deflected across said apertured electrode whereby the anode current experiences a reversal of slope, means for applying a varying voltage of one frequency between said deflecting electrodes and other means for applying a varying voltage of another frequency to said deflecting electrodes for causing a recurrent change in transconductance from a positive to a negative value for producing in effect a phase reversal of the component of output current in the anode at said one frequency, and a component of output current at a third frequency.

11. A frequency changing system for superheterodyne operation and including an electron discharge device having a cathode for supplying a stream of electrons and an anode for collecting said electrons, an apertured electrode positioned in front of said anode, said apertured electrode being provided with a plurality of apertures, and a pair of deflecting electrodes between the cathode and the apertured electrode, said electron discharge device having a transconductance characteristic passing a plurality of times in succession through positive and negative values when the stream of electrons is deflected across said apertured electrode whereby the anode current curve experiences a plurality of changes of slope, means for applying a varying voltage of one frequency to said deflecting electrodes and other means for applying a varying voltage of another frequency to said deflecting electrodes for causing a recurrent change in transconductance from positive to a negative value and for producing a component of output current at a third frequency.

12. A frequency changing system for superheterodyne operation and including an electron discharge device having a cathode for supplying electrons and a focusing electrode for forming said electrons into a directed beam, and an output electrode for said electrons, and means positioned between the cathode and output electrode and including a plurality of apertured elements successively positioned and with the apertures in alignment, the apertured element next adjacent the output electrode being provided with a double aperture, and deflecting means adapted to have a varying control voltage applied thereto positioned between the double apertured element and the other apertured elements for deflecting the beam of electrons across the double apertured element to said output electrode whereby the electron discharge device displays a control electrode voltage-output current characteristic which increases from a substantially zero value to a maximum value and a minimum value in succession when the control voltage on the deflecting means deflects the electron beam from an axial path to either side of said path whereby the transconductance characteristic of such a tube displays positive and negative values and passes a plurality of times through a zero value, means for applying operating voltages to said electron discharge device to bias the device to the point of substantially zero value, means for applying to said deflecting means a varying voltage of one frequency, and other means for applying to said deflecting means a varying voltage of another frequency, said varying voltages producing in the output electrode a component of output current at a third frequency, and an output circuit connected to said electron discharge device.

13. A frequency changing system for superheterodyne operation and including an electron discharge device having a cathode for supplying electrons and a focusing electrode for forming said electrons into a directed beam, and an anode for said electrons, and means positioned between the cathode and anode and including a plurality of apertured elements successively positioned with the apertures in alignment, the apertured element next adjacent the anode being provided with a double aperture, and deflecting electrodes positioned between the double apertured element and the next adjacent apertured element and closely adjacent the next adjacent apertured element for providing an electron lens action and for deflecting the beam of electrons across the apertured element to said anode whereby the electron discharge device displays a control electrode voltage-anode current characteristic which increases from a substantially zero value to a maxium value and a minimum value in succession whenever the beam of electrons is deflected to either side of an axial path whereby the transconductance characteristic of such a tube has positive and negative values and passes a plurality of times through a zero value, means for applying to said deflecting electrodes a varying voltage of one frequency, and other means for applying to said deflecting electrodes a varying voltage of another frequency for producing in effect in the anode electrode a phase reversal of the component of output current at said one frequency and an output circuit connected to said anode, the application of said varying voltages at different frequencies producing a component of output current in said output circuit at a third frequency.

14. A frequency changing system for superheterodyne operation and including an electron discharge device having a source of electrons, a control electrode means and an output electrode toward which said electrons are directed to provide an output current, said electron discharge device having a negative and positive transconductance characteristic curve which passes a plurality of times through a zero value, means for applying operating voltages to said electron discharge device for adjusting said device to a point of maximum transconductance between two points of zero transconductance on said transconductance characteristic curve when no varying control voltages are applied to said control electrode means, means for applying to said control electrode means a voltage of one frequency of the order of $f$ and other means for applying to said control electrode means a voltage of another frequency of the order of $1/n\ f$, where $n$ is an integer for modulating the first voltage for producing a recurrent phase reversal of the component of output current at the frequency of $f$ and for producing a component of output current in the output electrode at a third frequency.

15. A frequency changing system for superheterodyne operation and including an electron discharge device having a negative and positive transconductance characteristic curve which passes a plurality of times through a zero value whereby the output current experiences a reversal of slope each time said transconductance passes through a zero value and having a source of electrons, a control electrode means and an output electrode toward which said electrons are directed to provide an output current, means for applying operating voltages to said electron discharge device for adjusting said device to a point of zero transconductance on said transconductance characteristic curve when no varying control voltages are applied to said control electrode means, means for applying to said control electrode means a voltage of one frequency of the order of $f$ and other means for applying to said control electrode means a voltage of another frequency of the order of $1/n\ f$, where $n$ is an integer for modulating the first voltage to produce in the output electrode a recurrent phase reversal of the current in the output electrode at a third frequency.

16. The method of operating a frequency changing system for superheterodyne operation, said system employing an electron discharge device provided with a source of electrons, a control electrode means and an output electrode and having a transconductance characteristic passing through negative and positive values whereby the output current experiences a reversal of slope and comprising the steps of applying biasing voltages to said electron discharge device for adjusting the device to a point of transconductance such that with varying control voltages applied to said control electrode means the transconductance will vary periodically between negative and positive values, applying to said control electrode means a varying voltage of one frequency and applying a second varying voltage at another frequency to said control electrode means for producing in effect a phase reversal of the component of output current at said one frequency and a component of output current at a third frequency.

17. A method of operating a frequency changing system for superheterodyne operation, said system employing an electron discharge device provided with a source of electrons, a control electrode means and an output electrode and having a control voltage-output current characteristic in which the output current experiences a reversal of slope, the steps comprising applying biasing voltages to said electron discharge device for adjusting said device to a point on the control voltage-output current characteristic curve between portions where the output current is of opposite slope, applying to said control electrode means a varying voltage of one frequency and applying a second varying voltage of another frequency to said control electrode means for producing periodically a reversal of the slope of output current at said one frequency and an output current of a third frequency.

18. The method of operating a frequency changing system for superheterodyne operation, said system utilizing an electron discharge device provided with a source of electrons, a control electrode means and an output electrode and having a negative and positive transconductance characteristic curve which passes a plurality of times through a zero value whereby the output current experiences a reversal of slope, the steps comprising applying biasing voltages to said electron discharge device for adjusting said device to a point of maximum transconductance between two points of zero transconductance on said transconductance characteristic curve, applying to said control electrode means a varying voltage of a frequency of the order of $f$ and applying to said control electrode means a second voltage of a different frequency of the order of $1/n\ f$, where $n$ is an integer to produce in effect a periodic phase reversal of the component of output current of said frequency of $f$ and an output current component of a third frequency.

19. The method of operating a frequency changing system for superheterodyne operation, said system utilizing an electron discharge device provided with a source of electrons, a control electrode means and an output electrode toward which said electrons are directed to provide an output current, and having a negative and positive transconductance characteristic curve which passes a plurality of times through a zero value, whereby the output current experiences a phase reversal each time said transconductance passes through a zero value, the steps comprising applying biasing voltages to said electron discharge device for adjusting said device to a point of zero transconductance on said transconductance characteristic curve, applying to said control electrode means a varying voltage of one frequency of the order of $f$ and applying to said control electrode means a second varying voltage of another frequency of the order of $1/n\ f$, where $n$ is an integer for producing in effect a periodic phase reversal of the component of output current at the frequency of $f$, and an output current component at a third frequency.

20. The method of operating a frequency changing system for superheterodyne operation, said system utilizing an electron discharge device provided with a source of electrons, a control electrode means and an output electrode, and having a transconductance characteristic passing a plurality of times in succession through negative and positive values, whereby the output current experiences a phase reversal, the steps comprising applying voltage to said electron discharge device for adjusting said device to a predetermined point of transconductance whereby varying voltages applied to said control electrode means will cause said transconductance characteristic to pass a plurality of times successively through negative and positive values, applying to said control electrode means a varying voltage at one frequency and applying to said control electrode means a second varying voltage of another frequency for producing in effect a phase reversal of the component of output current at said one frequency and a component of output current at a third frequency.

21. A frequency changing system for superheterodyne operation and including an electron discharge device having a cathode for supplying a stream of electrons and an anode for collecting said electrons, a pair of successive apertured electrodes positioned between the cathode and the anode, a pair of deflecting electrodes positioned between the cathode and the first of the apertured electrodes, and a second pair of deflecting electrodes positioned between the pair of apertured electrodes, said electron discharge device having a transconductance characteristic passing through positive and negative values when a stream of electrons is deflected across the apertured electrodes whereby the anode current experiences a reversal of slope, means for applying a varying voltage of one frequency between one pair of deflecting electrodes and other means for applying a varying voltage of another frequency to the other pair of deflecting electrodes for causing recurrent change in transconductance from a positive to a negative value for producing in effect a phase reversal of a component of output current in the anode of said one frequency and a component of output current at a third frequency.

22. A frequency changing system for superheterodyne operation and including an electron discharge device having a cathode for supplying electrons and a focusing electrode for forming said electrons into a directed beam, and an output electrode for said electrons, and means positioned between the cathode and the output electrode and including a plurality of apertured elements successively positioned with the apertures in alignment, the apertured element next adjacent the output electrode being provided with a double aperture, deflecting electrodes positioned between the cathode and the apertured elements, and deflecting electrodes positioned between the apertured elements, said deflecting electrodes being adapted to have varying control voltages applied thereto for deflecting the beam of electrons across the apertured elements whereby the electron discharge device displays a control electrode voltage-output current characteristic which increases from a substantially zero value to a maximum value and a minimum value in succession when the control voltages on the deflecting electrodes deflect the electron beam from an axial path to either side of said path whereby the transconductance characteristic of said tube displays positive and negative values, means for applying operating voltages to said electron discharge device to bias the device to a point of minimum output current, means for applying to one pair of deflecting electrodes a varying voltage of one frequency and other means for applying to the other deflecting electrodes a varying voltage of another frequency, said varying voltages producing in the output electrode a component of output current of a third frequency, and an output circuit connected to said electron discharge device.

EDWARD W. HEROLD.